United States Patent [19]
Volz

[11] 3,875,936
[45] Apr. 8, 1975

[54] TROCHANTARIC ATTACHMENT ASSEMBLY AND METHOD OF USING SAME

[76] Inventor: Robert G. Volz, 3941 S. Cherry, Englewood, Colo. 80110

[22] Filed: Dec. 18, 1972

[21] Appl. No.: 316,081

[52] U.S. Cl............................. 128/92 CA; 128/92 B
[51] Int. Cl. .............................................. A61f 5/04
[58] Field of Search......... 128/92 CA, 92 BA, 92 B, 128/92 R, 92 BB, 83; 85/11, 14

[56] References Cited
UNITED STATES PATENTS

| | | | |
|---|---|---|---|
| 1,598,199 | 8/1926 | Johansson et al. | 85/11 |
| 2,112,007 | 3/1938 | Adams | 128/92 B |
| 2,397,545 | 4/1946 | Hardinge | 128/92 B |
| 2,511,051 | 6/1950 | Dzus | 128/92 B |
| 2,558,132 | 6/1951 | Green | 85/14 |
| 2,628,614 | 2/1953 | Briggs | 128/92 BA |
| 2,682,265 | 6/1954 | Collison | 128/92 CA |

FOREIGN PATENTS OR APPLICATIONS

| | | | |
|---|---|---|---|
| 799,347 | 6/1936 | France | 85/11 |
| 768,265 | 8/1934 | France | 85/11 |

*Primary Examiner*—Richard A. Gaudet
*Assistant Examiner*—J. Yasko

[57] ABSTRACT

An attachment assembly specifically adapted for reattachment of an excised greater trochanter bone segment to the femur bone includes a shear washer to join together the abutting faces of the femur and the trochanter bone segments and a bolt which passes through the center of the shear washer and through a pre-drilled opening in the greater trochanter whereby an angularly extending shank portion of the bolt is anchored in the femoral canal so that a nut threaded on the bolt can be tightened to draw the greater trochanter into accurately aligned, abutting relationship with the femur; also, the bolt will cooperate with the shear washer to positively prevent relative movement between the reattached bone segments during the healing process. The method of using the attachment assembly comprises the steps of drilling a hole through the severed trochanter, inserting the bolt into the femur so that a threaded end portion of the bolt extends substantially normally away from the severed face of the femur, embedding the shear washer in the severed face of both the femur and the trochanter so that it is substantially concentric with the protruding end of the bolt, and screwing a nut onto the outer end of the bolt to tighten the trochanter against the femur to promote reunification of the bone segments.

7 Claims, 11 Drawing Figures

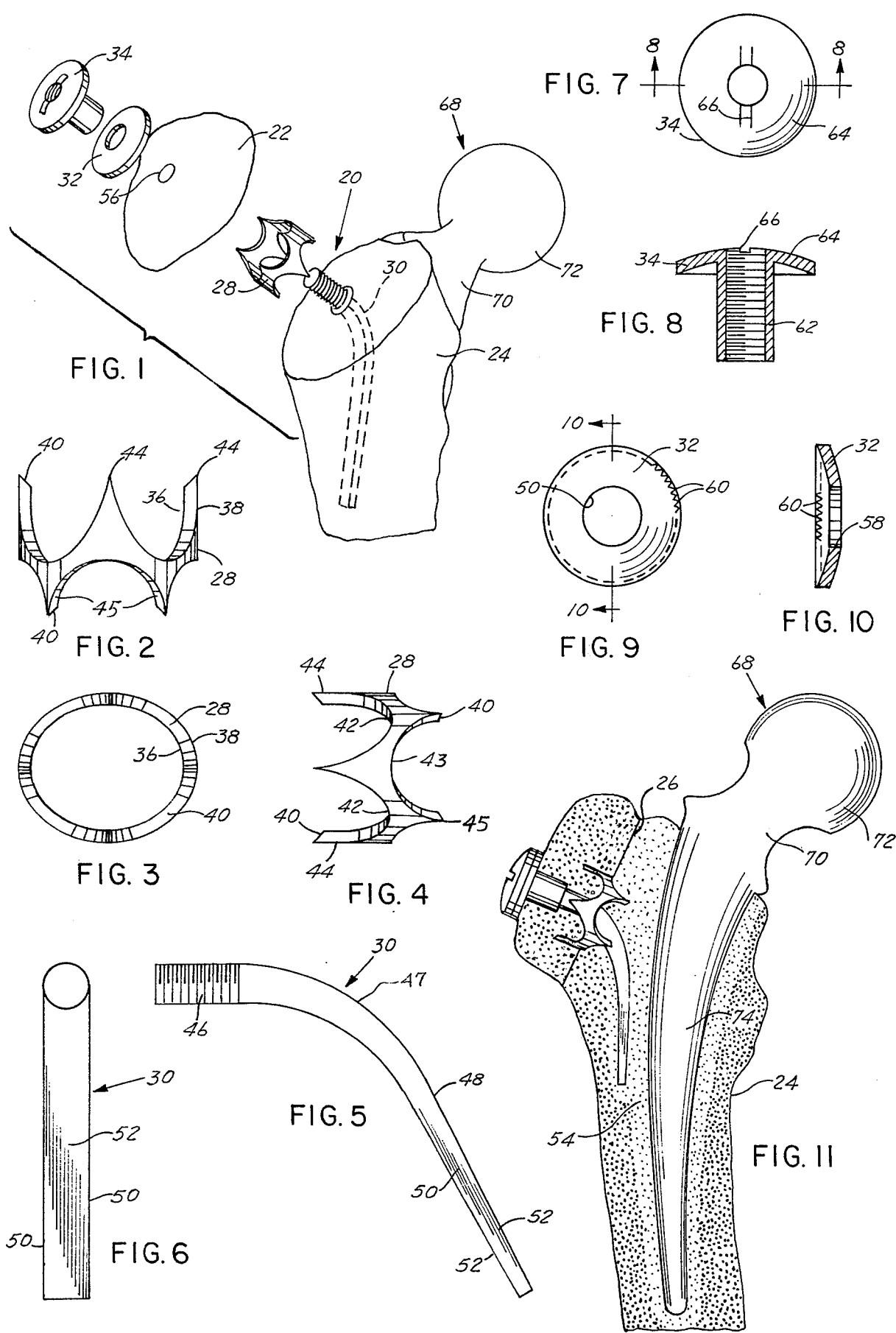

TROCHANTARIC ATTACHMENT ASSEMBLY AND METHOD OF USING SAME

The present invention relates generally to means and a method for fastening separated bone segments and more particularly to a novel and improved attachment assembly and method of using same to positively reattach separated bone segments so as to absorb shear forces and prevent relative movement between the bone segments.

In one type of bone injury, specifically fracture or deterioration in the hip joint of the acetabulum or femoral neck or head, it has been found helpful to sever the greater trochanter from the femur to obtain better access to the hip joint. The only disadvantage with severing the greater trochanter from the femur has been the lack of positive, reliable means for reattaching the greater trochanter. Numerous fracture repairing devices have been contrived to hold separated bone fragments together, but to applicant's knowledge, none of the devices is entirely satisfactory, particularly in regard to the absorption of shear forces along the interface of the reunited bone segments as are present in the reunification of a severed trochanter. Disclosures of prior art fracture attachment devices may be found in U.S. Pat. No. 2,381,050 issued to Mervyn Hardinge; U.S. Pat. No. 2,702,543 issued to Willis and Helen Pugh; Pat. No. 2,397,545 issued to Mervyn Hardinge; and U.S. Pat. No. 2,489,870 issued to W. Dzus.

The attachment assembly of the present invention was devised to positively reattach separated bone segments in a manner such that they are tightly held in abutting relationship and are positively prevented from displacement, especially under applied shear forces, whereby conditions highly desirable to rapid reunification and healing of the bone segments are established. An important component part of the attachment assembly is a shear washer having sharpened, axially extending oppositely directed edges so as to be easily embedded edgewise in the abutting surfaces of each bone segment in a manner such that the bone segments are easily aligned and retained in contiguous relationship. The shear washer absorbs shear forces exerted along the interface between the bone segments and thereby helps in preventing relative movement. In order that the bone segments may be tightly drawn together along the interface to facilitate rapid reunification, an anchor bolt having a threaded end portion and a shank has its shank embedded in one bone segment so that the threaded end of the bolt extends outwardly through the shear washer away from the surface of the bone segment. The other bone segment is provided with a predrilled opening adapted to receive the threaded end of the bolt in a manner such that a nut screwed onto the outer end of the bolt against a serrated washer can be tightened to draw the two bone segments into abutting immovable relationship. According to the method of the present invention, a hole is drilled in one bone segment and the bolt anchored in the other bone segment so as to extend outwardly through the hole in the first bone segment, and the shear washer is embedded in the abutting faces of the two bone segments so as to be concentric with the bolt whereby a nut can be screwed onto the bolt to tighten the severed bone segments together to promote rapid reunification.

Accordingly, it is an object of the present invention to provide a novel and improved attachment assembly for reattachment of separated bone segments.

It is another object of the present invention to provide an attachment assembly and method of use thereof for reuniting separated bone segments which utilizes a shear washer that can be embedded in opposing faces of separated bone segments so as to retain the bone segments in contiguous relationship with each other and to absorb shear forces along the opposing faces.

It is another object of the present invention to provide an attachment assembly for reattaching separated bone segments, the assembly including a shear washer adapted to be embedded in opposing faces of the bone segments and an anchor bolt adapted to be embedded in one bone segment so as to protrude through the other bone segment whereby the two segments can be tightly pulled together by a nut and a washer combination threaded on the bolt.

Other objects, advantages and capabilities of the present invention will become more apparent as the description proceeds taken in conjunction with the accompanying drawings, in which:

FIG. 1 is an exploded diagrammatic perspective view of the attachment assembly of the present invention being used to reunite an excised greater trochanter with the femur bone;

FIG. 2 is a front elevation of the shear washer of the attachment assembly shown in FIG. 1;

FIG. 3 is a top plan of the shear washer of FIG. 2;

FIG. 4 is an end elevation of the shear washer of FIG. 2;

FIG. 5 is a side elevation of the anchor bolt of the attachment assembly of FIG. 1;

FIG. 6 is a front elevation of the bolt of FIG. 5;

FIG. 7 is a top plan of the nut of the attachment assembly of FIG. 1;

FIG. 8 is a section taken along line 8—8 of FIG. 7;

FIG. 9 is a bottom plan of the serrated washer of the attachment assembly of FIG. 1;

FIG. 10 is a section taken along line 10—10 of FIG. 9; and

FIG. 11 is a diagrammatic side elevation of the proximal end of a femur bone with an excised greater trochanter reattached to the femur by the attachment assembly of FIG. 1.

While the surgical attachment assembly 20 of the present invention could find use in various surgical operations, for purposes of the present disclosure, the attachment assembly is described and illustrated in connection with the reattachment of an excised greater trochanter 22 to the femur bone 24. Thus, there is shown by way of illustrative example in FIG. 1, the proximal end of the femur 24 with the greater trochanter 22 severed therefrom as is common in hip surgery to gain access to the hip joint. It will be appreciated that the plane of severance or osteotomy site 26, FIG. 11, between the two bone segments is substantially smooth and flat and that the bone segments will readily reunite or heal through processes of nature if they are properly aligned and held in immovable tight abutting relationship for a substantial period of time.

The attachment assembly 20 of the present invention, best seen in FIG. 1, includes a shear washer 28, an anchor bolt 30, a serrated washer 32, and a nut 34 which in combination cooperate to positively hold the separated bone segments 22 and 24 in immovable tight abutting relationship and in a manner so as to absorb shear forces along the interface between the segments. It is important that each component part be made of the same or of non-reacting materials, such as Vitalluim, so as to prevent electrolysis after implant in the body.

An important feature of the attachment assembly 20 is the shear washer 28 which can be seen in FIGS. 2 through 4 to comprise a substantially circular, oval, or elliptical annular body which is relatively thin and has smooth inner and outer circumferential surfaces 36 and 38, respectively, and oppositely directed, axially extending scalloped edges 40 which are beveled so as to be sharp. The sharp edges 40 enable the shear washer to be easily embeddable in each bone segment and, due to the smooth inner and outer surfaces 36 and 38, respectively, the washer 28 can be completely embedded in the respective bone segments when the segments are moved into contiguous relationship along the plane of severance 26. As can be seen in FIGS. 2 and 4, the scalloped edges 40 of the shear washer take the form of substantially semicircular concave segments 42 and 43 which define longer and shorter sharp spikes 44 and 45, respectively therebetween that extend axially in opposite directions. The spikes 44 and 45, of course, facilitate insertion of the shear washer in the bone and the arcuate segments 42 and 43 diminish the surface area of the inner and outer surfaces 36 and 38 preferably to the extent that the segments 42 and 43 are of a depth to terminate substantially in a common plane passing transversely through an intermediate section of the washer, as seen from FIGS. 2 and 4. In this way, the washer is easily inserted into the faces of the bone segments 22 and 24 with minimal frictional drag. Once embedded, the shear washer provides a highly desirable absorption medium for shear forces along the interface between the bone segments in that the body of the washer lies substantially normal to the plane of severance and consequently to shear forces which are directed along the plane of severance.

The anchor bolt 30, which is best seen in FIGS. 5 and 6, can be seen to have a threaded end portion 46 of circular cross-section, a central forwardly tapered curved portion 47, and a forwardly tapered shank portion 48 of substantially rectangular cross-section that is angularly related to the threaded end 46. The central curved portion 47 of the anchor bolt provides a continuous smooth connection between the threaded end 46 of the bolt and the shank portion 48. The central curved portion 47 and the shank portion 48 have two arcuate sides 50 and two flat sides 52, the flat sides converging away from the threaded end portion so that the bolt tapers and is more easily embeddable in the bone. The shank portion 48 of the bolt, as will be appreciated from FIG. 1, is adapted to be embedded in the central, relatively soft canal portion or cancellous 54 of the femur bone in a manner such that it lies substantially parallel to a longitudinal axis of the femur with the threaded end portion 46 protruding substantially normally away from the flat face of the femur along the plane of severance. One desirable asset of the angular relationship between the shank portion 48 and the threaded end portion 46 is that the bolt may be positively anchored in the femur such that an axial force placed on the threaded end portion of the bolt, as by the nut 34, will not pull the shank portion of the bolt out of the femoral canal 54.

A hole 56, FIG. 1, slightly larger in diameter than the threaded end 46 of the anchor bolt is drilled through the greater trochanter 22 so as to be substantially normal to the face of the trochanter along the plane of severance 26. In this manner, when the trochanter is fitted over the threaded end of the anchor bolt in flush abutting relationship with the femur, the threaded end 46 of the bolt will extend outwardly a short distance from the outer surface of the trochanter. The serrated washer 32 is placed around the outer end of the bolt so that the nut 34 can be screwed onto the bolt to tighten the washer 32 against the outer surface of the trochanter thereby compressing the two bone segments 22 and 24 into tight abutting relationship.

The serrated washer 32 which is best seen in FIGS. 9 and 10, comprises a dish-shaped member with a central opening 58 for reception of the anchor bolt and a series of notched serrations 60 in its lower edge adjacent the concave side of the washer. Accordingly, when the washer is tightened against the outer surface of the trochanter, the notched serrations 60 will partially embed in the outer surface of the bone to positively position the washer and consequently the threaded end of the bolt relative to the trochanter.

The nut 34 in the disclosed form has an elongated cylindrical body 62, the outside diameter of which is slightly less than the diameter of the opening 58 through the serrated washer and is internally threaded to mate with the threaded end 46 of the bolt 30 so that as the nut is screwed onto the anchor bolt, the cylindrical body portion 62 of the nut will pass inwardly through the opening 58 in the washer 32 until the concave head portion 64 of the nut moves into engagement with the convex outer surface of the washer. A screwdriver slot 66 is provided in the head 64 of the nut to facilitate advancement of the nut along the threaded portion 46 of the bolt.

In FIG. 11, the surgical attachment assembly is shown in its operative configuration holding the previously excised greater trochanter 22 onto the femur 24, the femur having a prothesis 68 with neck 70, head 72, and stem 74 portions embedded therein. It will be readily appreciated that the angular relation of the shank portion 48 of the bolt to the threaded end portion 46, in addition to more positively anchoring the bolt in the femur, allows the bolt to be embedded in the femoral canal 54 alongside the stem 74 of the prothesis 68 in substantially parallel relationship with the longitudinal axis of the femur.

Accordingly, an attachment assembly finding a particularly useful application in surgical operations has been described in relation to the reattachment of an excised greater trochanter to the femur, it being understood that the attachment assembly could very well find various other uses in surgical procedures involving other areas of the body. By way of illustration and not limitation, in one particular embodiment of the attachment assembly found useful in reuniting the greater trochanter with the femur, the shear washer was elliptically shaped having a major diameter of 0.797 in., a minor diameter of 0.687 in. and a thickness of 0.062 in. The overall height of the washer was 0.625 in. with the shorter spikes extending 0.25 in. away from the lower extent of an adjacent arcuate segment of the sharp edge of the washer and the longer spikes extending 0.375 in. away from the lower extent of an adjacent arcuate segment. The arcuate segments on opposite sides of the washer were staggered 45° and arcuate segments on opposite ends were separated by 0.094 in. The overall length of the anchor bolt was slightly over 2 inches with the threaded portion being 0.375 in. The diameter of the threaded portion was 0.030 in. and the extreme opposite end of the bolt was substantially rectangular having side measurements of 0.187 in. and 0.093 in.

In the method of using the attachment assembly to reunite an excised greater trochanter with the femur bone, the angular bolt is first inserted into the face of the femur at the plane of severance so that the threaded end of the anchor bolt protrudes substantially normally away from the plane of severance. A hole is then drilled through the greater trochanter so as to be normal to the plane of severance and also so that the greater trochanter can be placed on the threaded end of the bolt with the outer edges of the trochanter aligned properly with the femur. The shear washer is thereafter embedded in the respective bone segments with the longer spikes embedded in the femur and the shorter spikes in the trochanter and with the inner curved surfaces of the arcuate segments 42 and 43 substantially even with the plane of severance. The greater trochanter will then be aligned and in abutting contiguous relationship with the femur so that the threaded end of the anchor bolt protrudes outwardly a short distance from the outer surface of the trochanter. The serrated washer is then placed around the threaded end of the bolt so that the serrations engage the outer surface of the trochanter and the nut threaded onto the bolt to draw the trochanter tightly against the femur establishing conditions of rapid reunification for the bone segments.

Although the present invention has been described with a certain degree of particularity, it is understood that the present disclosure has been made by way of example and that changes in details of structure or method may be made without departing from the spirit thereof.

What is claimed is:

1. In a trochanteric attachment assembly for reuniting separated bone segments, said assembly having means for drawing the bone segments into tight abutting relationship along an interface, said means comprising a substantially cylindrical shear washer having relatively smooth inner and outer circumferential surfaces and scalloped, oppositely directed, axially extending portions, said scalloped portions including adjacent arcuate concave segments terminating in sharp spikes therebetween adapted to be embedded axially into each bone segment along the interface therebetween, and a bolt member adapted to extend through said first bone segment and said shear washer into said second bone segment, said bolt member including tightening means at one end to cause said bone segments to be drawn into contiguous abutting relationship to one another until said shear washer is fully embedded in said bone segments.

2. A fastener for joining first and second separated bone segments to positively prevent relative movement therebetween comprising in combination, a shear washer provided with an axial opening therethrough, said shear washer including an annular body and sharpened axially extending portions to facilitate axial insertion of the washer into the bone segments, a bolt member having a shank portion adapted to be embedded in said first bone segment, said bolt passing through the opening in said shear washer and protruding angularly into said second bone segment, said protruding portion of the bolt member having threads on its outer end, and a nut adapted to be screwed onto the threaded end of the bolt to draw the bone segments into tight abutting relationship whereby they are positively prevented from relative movement.

3. The fastener of claim 2 further including a washer surrounding the bolt and placed between the nut and the second bone segment.

4. The fastener of claim 3 wherein said washer is serrated along one side so as to be partially embeddable in said second bone segment.

5. The fastener of claim 4 wherein said bolt includes a central curved portion connecting the protruding portion of the bolt to the shank portion so that the shank portion is angularly related to the protruding portion of the bolt.

6. Fastener means for joining first and second separated bone segments to positively prevent relative movement therebetween comprising in combination, a shear washer adapted to be embedded in both first and second bone segments along their interface, said shear washer comprising a substantially cylindrical body having axially smooth inner and outer circumferential surfaces, sharpened axially extending oppositely directed portions along the edges of said shear washer, said sharpened portions comprising a plurality of substantially semicircular adjacent arcuate segments, sharp spikes between said arcuate segments, the spikes along one edge being peripherally offset from the spikes along the other edge, a bolt member having a threaded end portion, a forwardly tapering shank portion, and a curved central portion connecting the threaded end portion to the shank portion so that the shank portion is angularly related to the threaded end portion, said shank portion adapted to be embedded in said first bone segment such that the threaded end of the bolt protrudes through the shear washer and outwardly away from the first bone segment for passage through an opening in said second bone segment, a nut threaded onto the bolt to draw the bone segments into tight abutting relationship whereby they are positively prevented from relative movement, and a washer having a serrated edge positioned around the bolt adapted to be between the nut and the second bone segment such that the serrated edge of the washer is at least partially embedded in the second bone segment to positively position the washer relative to the second bone segment.

7. A method of reuniting a severed trochanter with the femur bone comprising the steps of drilling a hole through the severed trochanter which is substantially normal to the surface of severance, inserting an anchor bolt into the femur so that a threaded end portion of the bolt extends substantially normally away from the severed surface of the femur and in axial alignment with the opening through the trochanter when the trochanter is positioned on the femur in its normally occupied position, embedding an annular body in the severed surfaces of both the femur and the trochanter so that the annular body is substantially concentric with the threaded end of the anchor bolt and so that the trochanter and the femur are in abutting properly aligned relationship whereby the threaded end of the anchor bolt extends through the hole in the trochanter, and screwing a nut onto the threaded end of the bolt to tighten the trochanter against the femur to thereby promote reunification of the two bone segments.

* * * * *